| (12) | United States Patent | (10) Patent No.: | US 7,570,543 B2 |
|---|---|---|---|
| | Ferguson | (45) Date of Patent: | Aug. 4, 2009 |

(54) NORMALLY CLOSED PRESSURE-SENSITIVE HYDROPHONE SWITCH

(75) Inventor: Glen C. Ferguson, Monument Beach, MA (US)

(73) Assignee: Teledyne Benthos, Inc., North Falmouth, MA (US)

( * ) Notice: Subject to any disclaimer, the term of this patent is extended or adjusted under 35 U.S.C. 154(b) by 335 days.

(21) Appl. No.: 11/508,699

(22) Filed: Aug. 23, 2006

(65) Prior Publication Data

US 2007/0064527 A1 Mar. 22, 2007

Related U.S. Application Data

(60) Provisional application No. 60/715,561, filed on Sep. 9, 2005.

(51) Int. Cl.
*G01V 1/20* (2006.01)
*G01V 1/38* (2006.01)
*H04R 1/44* (2006.01)

(52) U.S. Cl. .......................... 367/172; 367/20; 367/167

(58) Field of Classification Search ................... 367/20, 367/154, 167, 172
See application file for complete search history.

(56) References Cited

U.S. PATENT DOCUMENTS 4,336,639 A * 6/1982 Berglund .................. 29/25.35

4,656,615 A 4/1987 Grice (Continued)

OTHER PUBLICATIONS

International Search Report and Written Opinion of the ISA mailed on Aug. 22, 2008 in International Patent Application No. PCT/US06/33377.

(Continued)

*Primary Examiner*—Jack W. Keith
*Assistant Examiner*—Scott A Hughes
(74) *Attorney, Agent, or Firm*—Foley & Lardner LLP (57) ABSTRACT

A pressure-sensitive switch comprising an electrically-insulating base member having front and back surfaces with a through opening extending between the two at the center of the base member. Two electrodes are mounted on the base member's front surface and each have an electrically-conductive contact surface. A flexible diaphragm has its periphery secured in a fluid-tight manner to the back surface of the base member and is provided with a post connected to the central portion of the diaphragm. The post extends through the base member where an electrically-conductive washer is fixed to it where it extends beyond the front surface of the base member. A fluid-tight cap is secured to the front surface, covering an area above the washer and preventing fluid from entering the switch mechanism. The diaphragm, which is formed with plural corrugations, is exposed to the external pressure. When the switch is exposed to atmospheric pressure, the washer connects the electrodes, but when the switch is exposed to a super-atmospheric pressure, the central portion of the diaphragm pushes the washer out of contact with both electrodes, thus electrically disconnecting the two electrodes. The pressure-sensitive switch is especially useful with hydrophones, as in seismic streamer cables.

16 Claims, 5 Drawing Sheets

U.S. PATENT DOCUMENTS

| | | | |
|---|---|---|---|
| 4,906,886 A | 3/1990 | Breimesser et al. | |
| 5,070,427 A | 12/1991 | Bush | |
| 5,646,470 A | 7/1997 | de Groot | |
| 5,675,556 A | 10/1997 | Erath et al. | |
| 5,764,595 A | 6/1998 | Power | |
| 5,815,466 A | 9/1998 | Erath | |
| 6,108,274 A | 8/2000 | Pearce | |
| 6,151,277 A | 11/2000 | Erath et al. | |
| 6,160,763 A | 12/2000 | Cole | |
| 6,175,301 B1 | 1/2001 | Piesinger | |
| 6,318,497 B1 | 11/2001 | de Groot et al. | |
| 6,614,724 B2 | 9/2003 | Behrens et al. | |
| 6,754,136 B2 * | 6/2004 | Constantinou et al. | 367/172 |
| 7,026,826 B2 | 4/2006 | Wilcoxon | |
| 2007/0070815 A1 * | 3/2007 | Hulsman et al. | 367/154 |

OTHER PUBLICATIONS

International Preliminary Examination Report for International application No. PCT/US01/02845, date of completion of report, Oct. 3, 2001, 3 pages.

International Search Report for International application No. PCT/US01/02845, mail date Apr. 30, 2001, 1 page.

Office Action for U.S. Appl. No. 11/503,637, mail date Nov. 28, 2008, 14 pages.

Amendment and Request for Reconsideration for U.S. Appl. No. 11/503,637, dated Jul. 29, 2008, 10 pages.

Office Action for U.S. Appl. No. 11/503,637, mail date Apr. 16, 2008, 9 pages.

* cited by examiner

NORMALLY CLOSED PRESSURE-SENSITIVE HYDROPHONE SWITCH

CROSS-REFERENCE TO RELATED APPLICATION

This application claims the benefit of priority from U.S. Provisional Patent Application No. 60/715,561 filed on Sep. 9, 2005 with the title, "NORMALLY CLOSED PRESSURE-SENSITIVE SWITCH AND ITS USE IN HYDROPHONE ARRAY", the entire contents of which are incorporated herein by reference.

FIELD OF THE INVENTION

This invention in general relates to pressure-sensitive switches and, in particular, their use with hydrophones that may be used in streamer arrays comprising multiple hydrophones.

BACKGROUND OF THE INVENTION

Pressure-sensitive switches are used in a variety of applications where it is desired to switch apparatus on or off at predetermined pressures. Switching may be desirable, for example, because the apparatus controlled by the switch may exceed its design limits, might be damaged, or give inaccurate and misleading readings when operated at extreme pressures. Certain government regulations also require that certain forms of commercial apparatus capable of both commercial and military uses, so-called dual use technology, be used with pressure sensitive switches to prevent them from being converted to military applications.

One important application of pressure-sensitive switches is in hydrophone streamer cable arrays used in underwater surveying. In such surveying, a survey ship tows a plurality of submerged cables extending substantially parallel to the ship's direction of travel. Each of the plurality (typically 4-10) of hydrophone cables is secured to one of a series of laterally spaced apart drums located on a ship's stern to keep them laterally separated so that they extend parallel to each other and to the ship's direction of travel. Additional lateral control is provided by paravanes associated with each cable to steer them as necessary. These hydrophone cables are of substantial length, up to 5000 meters. Each cable comprises a waterproof hollow elongate prismatic sheath, typically a hollow, flexible polymeric tube and at least one tensile member fixedly associated with the sheath; this tensile member providing structural integrity to the cable so that it will be not damaged by the substantial drag forces exerted upon the lengthy cable as it is towed through the water at speeds of several kilometers per hour. Commercial cables usually have three tensile members in the form of steel cables secured within the plastic tube at intervals of 120°. Hydrophones are secured within the plastic tube, inside the cables arranged at regular intervals along the axis of the tube, typically about 1 m. These hydrophones incorporate pressure detectors, normally piezoelectric detectors, capable of detecting sound pressure in the water caused by the explosions used in seismic surveying. The hollow interior of the tube is filled with oil so that vibrations in the water surrounding the cable are efficiently transmitted to the hydrophones. Electrical conductors extend the full length of the hydrophone cable to supply power to the detectors and to carry signal from the detectors back to recording and/or analysis equipment carried on the ship. Signal conditioning modules are usually included approximately every 300 m for amplification and signal conditioning such as filtering, if required.

Although commercial hydrophone cables are normally towed at depths of about 6 to about 25 meters during seismic surveying, the hydrophones they carry may operate down to 100 meters or more. As will be apparent to those knowledgeable in anti-submarine warfare, in the absence of any special precautions, a commercial hydrophone cable of the type already described would make an excellent submarine-hunting device, and international sales of such cables would have to be regulated under munitions control regulations. To permit international sales of commercial hydrophone cables and certain other dual-use technologies without cumbersome regulations, the United States and thirty-two other countries have concluded the Wassenaar Agreement on Export Controls for Conventional Arms and Dual-Use Goods and Technologies. This Wassenaar Agreement, and the U.S. government regulations promulgated thereunder (see Commerce Control List, Part 774, Supplement No. 1, Category 6—Sensors and Lasers) provide that hydrophone cables may be freely sold provided they are equipped with pressure-sensitive switches such that the hydrophones will cease to operate at depths exceeding 35 meters. This somewhat arbitrary limit is the average value of the depth of the thermocline present in deep ocean waters. To be useful in anti-submarine warfare, hydrophones must be capable of operating below the thermocline. Further, the commerce control list states that the pressure switches should not be adjustable once installed in the tube.

Providing a suitable form of pressure-sensitive switch to meet this "cut-out" requirement of the Wassenaar Agreement has proved difficult. Such a switch must be inexpensive. In practice, each of the thousands of individual hydrophones in an array needs its own switch (commercial users prefer to buy the hydrophone and the switch as an integrated unit, since installing separate hydrophones and switches in a cable is complicated and too expensive), and since the price for the integrated unit cannot exceed about $30, the cost of the switch must be very low. The pressure at which the switch closes cannot deviate substantially from the desired 35 meter setting, since in practice the hydrophones within each cable are arranged in sections of (typically) 96 further arranged in groups of 8 (typically), and premature closing of any one switch deactivates the entire group of hydrophones, so that premature closing of a few switches among the thousands in an array may deactivate so many hydrophones that the value of the survey may be greatly reduced, or the survey may even have to be suspended while the affected groups of hydrophones are replaced. With the costs of survey ships running into thousands of dollars per hour, such downtime is highly undesirable.

In addition, it is desirable for any switch used with a hydrophone to not appreciably add to the overall volume of the combination since limited space is allocated for each hydrophone in an array assembly. Moreover, it is important to keep the hydrophone sensitive detection areas as far as possible from the noisy boundary layer at the external surface of the cable to enhance signal to noise ratios. Therefore, the switch should not alter any optimized hydrophone design that achieves this feature, and it is desirable for the switch to be acoustically isolated from the hydrophone and not alter its acoustic response characteristics.

Finally, although the cable is designed to surround the hydrophones with a non-corrosive oil, in practice sea water often leaks into a cable during extended commercial use, so the switch should be capable of resisting corrosion by salt water. Preferred embodiments of the switch of the present invention allow adjustment of the closing pressure of individual switches at the time of manufacture.

The present invention seeks to provide a pressure-sensitive switch which is very suitable for use in a hydrophone cable (although it may be used in numerous other applications) and which reduces or eliminates the aforementioned disadvantages of prior art pressure sensitive switches. The pressure-sensitive switches used in hydrophone array applications are generally of either the normally-closed or normally-open variety, usually connected electrically with an associated hydrophone in the array. An example of the normally-open variety overcoming many of the aforementioned disadvantages is described in related U.S. Pat. No. 6,318,497. In certain hydrophone array systems, it is convenient or desirable to incorporate normally closed pressure-sensitive switches. Certain systems are designed, for example, to limit a pressure-sensitive switches' disabling effect to an individual hydrophone without disabling large numbers of other hydrophones in a connected group. Such a circuit is described in related U.S. patent application Ser. No. 11/503,637 filed on Aug. 14, 2006.

The switch of the present invention is especially useful in conjunction with hydrophones of the types described in U.S. Pat. Nos. 5,646,470 and 5,675,556, which are substantially cylindrical with openings at each end through which the external pressure is transmitted to the interior of the hydrophone.

It is a primary object of the present invention to provide a normally closed pressure sensitive-switch.

It is another object of the present invention to provide a pressure sensitive switch for use in disrupting signals from hydrophones that descend beyond a predetermined water depth.

It is yet another object of the present invention to provide a pressure sensitive switch for use with arrays of hydrophones to selectively disrupt signals from selected individual hydrophones exceeding proscribed operating conditions.

Other objects of the invention will, in part, be obvious and will, in part, appear hereinafter, when reading the following detailed description in connection with the drawings.

SUMMARY OF THE INVENTION

This invention provides a normally closed pressure-sensitive switch that disables an underwater survey sensor when the pressure-sensitive switch is activated at a predetermined depth.

In one aspect of the invention, the switch includes a base member made of electrically-insulating material having front and back surfaces with an opening through its central portion. Two electrodes are mounted on the front surface of the base member. On the back surface is a flexible diaphragm formed with multiple corrugations having a peripheral portion fixedly secured in a substantially fluid-tight manner, having a central portion overlying the opening formed through the base member. A post is attached to the central portion of the diaphragm and extends through the opening of the base member so that it can slide back and forth through the opening without interference. An electrically conductive washer is fixedly attached to the post where the post extends beyond the front side of the base member. When the switch is in its normally closed position, the washer electrically connects the two electrodes and when the switch is exposed to a predetermined pressure in excess of atmospheric pressure, the central portion of the diaphragm moves the post and thus the washer to separate the washer from the electrodes thereby disconnecting the electrodes and opening the switch and any attached circuit.

Also included is a cap secured in a substantially fluid-tight manner to the back front of the base member, enclosing an area over the opening and the cap and washer so that fluid does not leak into the mechanism while allowing the switching mechanism to actuate.

In another aspect of the invention, the electrodes on the front surface are part of a printed circuit board. In one aspect, the pattern includes a circularly shaped outer portion forming part of one electrode and a circularly shaped inner portion forming part of the second electrode wherein partial spokes radially extend alternatively between the inner and outer portions in the manner of meshed fingers.

Finally, this invention provides a hydrophone cable assembly comprising:

a waterproof hollow elongate prismatic sheath;

at least one tensile member fixedly secured to said sheath;

a plurality of hydrophones disposed within the hollow interior of said sheath at spaced intervals therealong;

signal transmission means for transmitting signals from said plurality of hydrophones to one end of said sheath; and at least one pressure-sensitive switch of the present invention arranged to inactivate said hydrophones when the hydrophone cable assembly is subjected to a pressure greater than a predetermined value.

BRIEF DESCRIPTION OF THE DRAWINGS

The structure, operation, and methodology of the invention, together with other objects and advantages thereof, may best be understood by reading the following detailed description in connection with the drawings in which each part has an assigned numeral or label that identifies it wherever it appears in the various drawings and wherein:

FIG. 3b is a reverse perspective of the exploded view of FIG. 3a;

DETAILED DESCRIPTION

Figure 1:
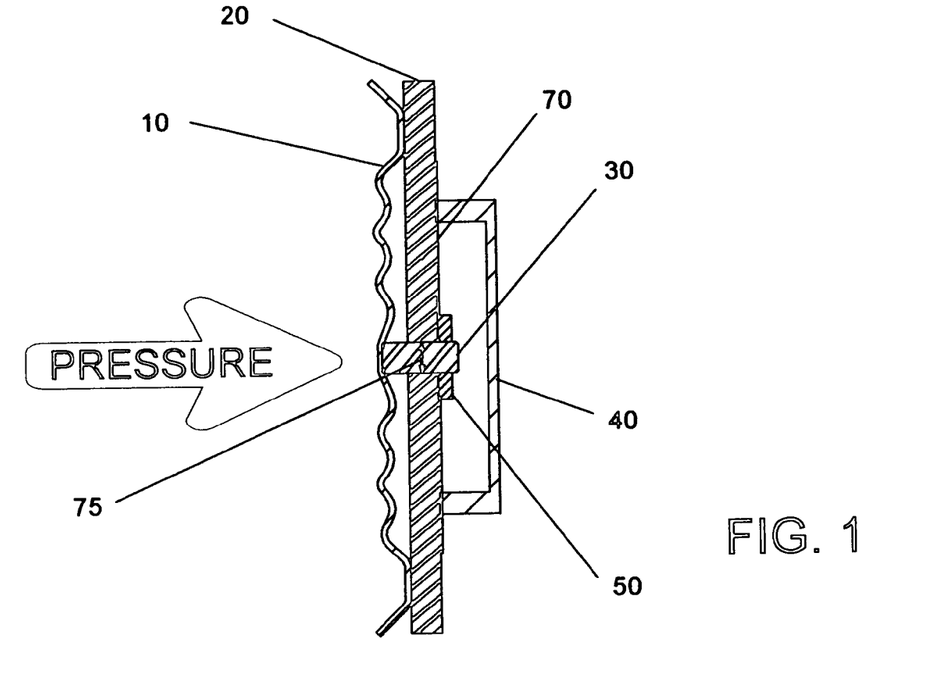
FIG. 1 is a cross section of a pressure-sensitive switch in accordance with the invention.

Reference is now made to FIG. 1 which shows a cross section of an embodiment of the inventive switch. As seen there, the switch comprises a base member 20 having a back surface 60 and a front surface 70. A through opening 75 is formed in the center of the base member 20 extending between its surfaces. The purpose of the through opening 75 is to permit a center post 30 to freely slide back and forth without interference. One end of center post 30 is attached to a diaphragm 10. Diaphragm 10 is mounted in a fluid-tight manner to base member 20. Details of example diaphragms and their assembly for use with the invention are described in U.S. Pat. No. 6,318,497, the entirety of which is incorporated herein by reference.

Fixed around center post 30 at a section which protrudes from front surface 70 is an electrically conductive washer 50. Front surface 70 has first and second electrodes 100 and 110 (shown in FIGS. 2-3). When exposed to atmospheric pressure, diaphragm 10 holds washer 50 against surface 70, which electrically connects electrodes 100 and 110. When exposed to predetermined pressures greater than atmospheric pressure, the center portion of diaphragm 50 moves toward surface 60 pushing center post 50 along with it in the direction of back surface 60. This action separates washer 50 from surface 70, thereby disconnecting electrodes 100 and 110 causing the switch to open. Cap 40 provides a fluid-tight cover to keep liquid from interfering with the diaphragm and switch opening mechanism.

Figure 2:
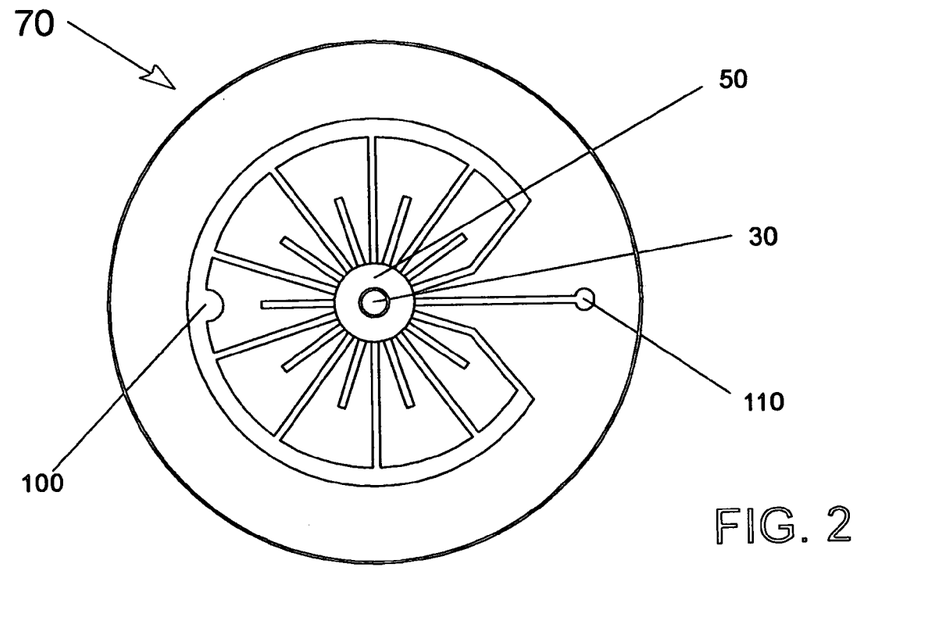
FIG. 2 is a top view of the base member's front surface in accordance with the inventive switch.
Figure 3A:
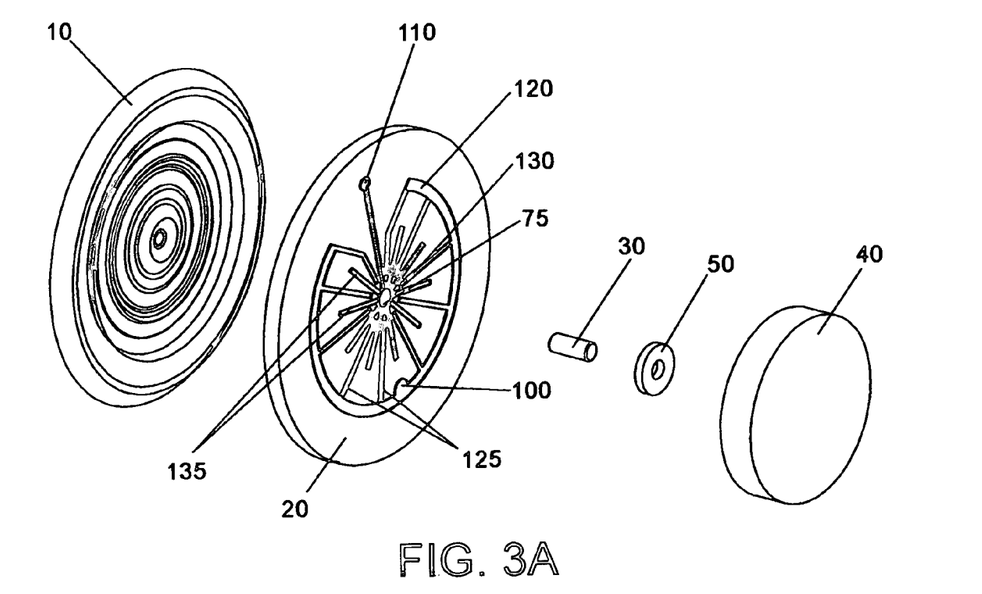
FIG. 3a is a diagrammatic exploded perspective view of elements of the inventive pressure-sensitive switch.

Now referring to FIG. 2, electrodes 100 and 110 may alternatively be comprised of printed circuit boards mounted on base member 20. Base member 20 (shown in FIG. 1) may alternatively be the board upon which the patterns of electrodes 100 and 110 are printed and to which diaphragm 10 is mounted. Washer 50 is shown partially covering a pattern for electrodes 100 and 110, shown in more detail in FIG. 3a.

Figure 3B:
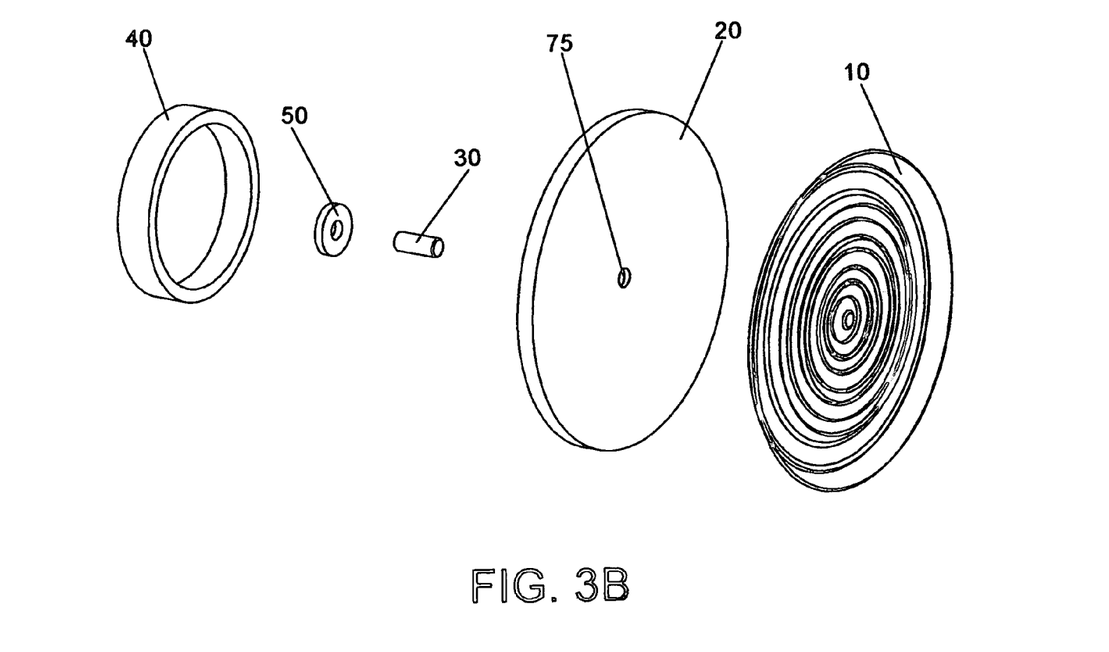
Figure 4A:
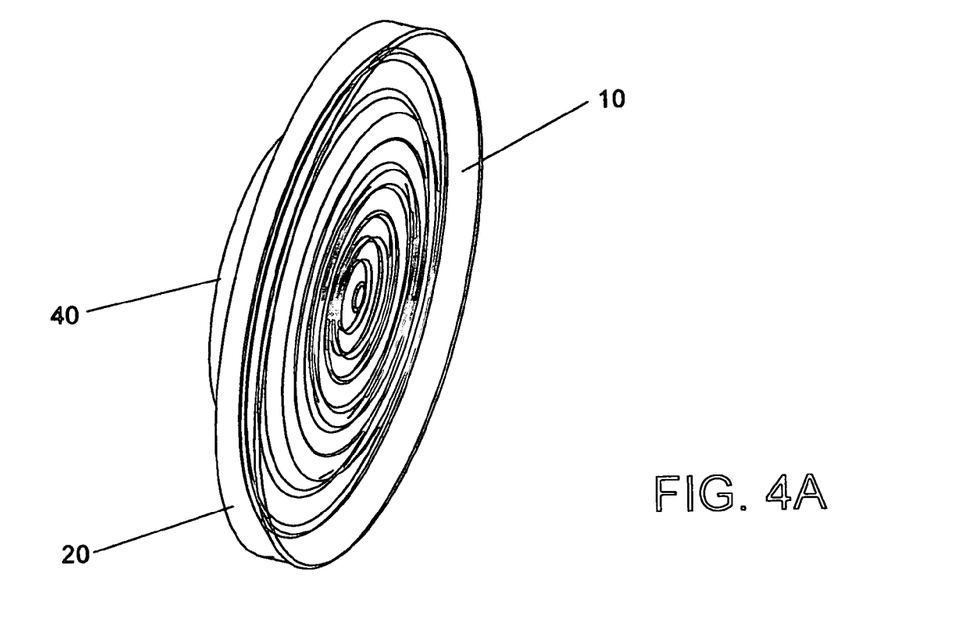
FIG. 4a is a diagrammatic perspective view of the base member's back surface and attached diaphram.
Figure 4B:
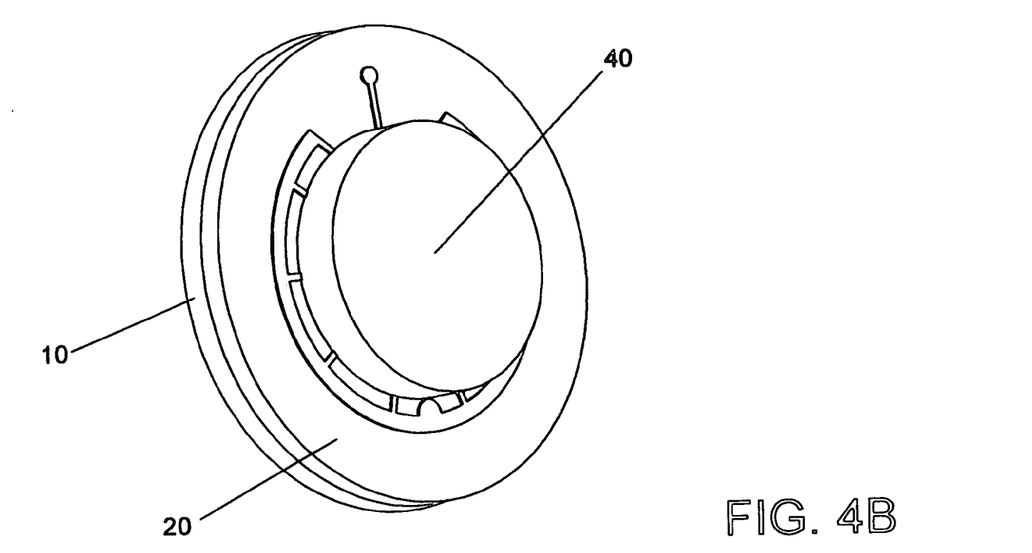
FIG. 4b is a diagrammatic perspective view of the base member's front surface and attached fluid-tight cap.

Referring to FIG. 3a, electrode 100 forms a part-circle 120 about through opening 75 with partial spokes 125 radially extending inwardly toward and distributed around the center of the pattern. Electrode 110 has an inner portion 130 about opening 75 with partial spokes 135 radially extending outwardly and alternating with spokes 125. FIG. 3b shows a reverse perspective of FIG. 3a.

Figure 5:
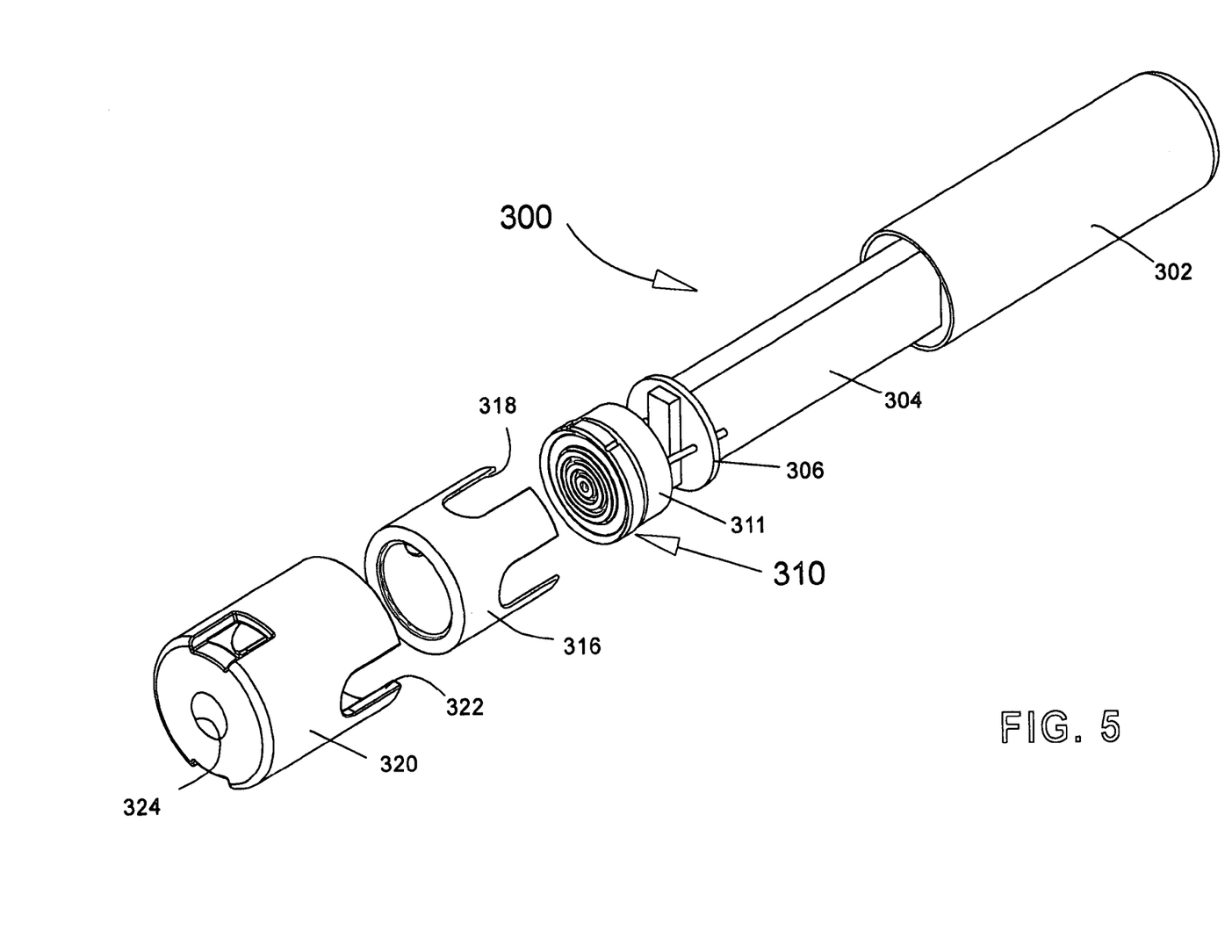
FIG. 5 is a diagrammatic perspective view of a hydrophone system incorporating the pressure-sensitive switch of FIGS. 1-5.
Figure 6:
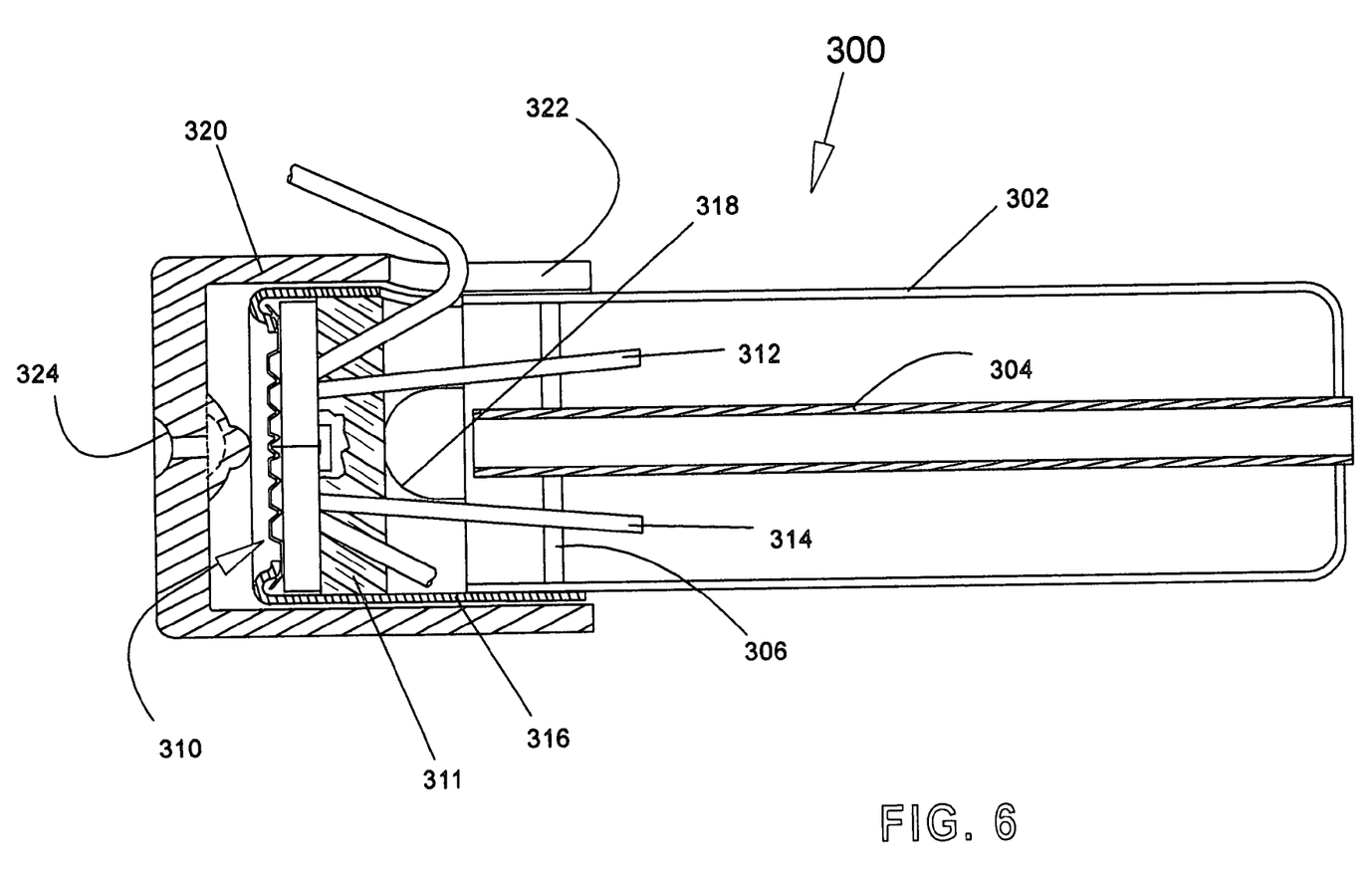
FIG. 6 is a cross-sectional view of the hydrophone system of FIG. 5, according to an exemplary embodiment.

An example of a hydrophone system incorporating the pressure sensitive switch previously described is shown diagrammatically in FIGS. 5 and 6 where the system is designated generally at 300. System 300 is seen to comprise an elongated tin coated brass tubular housing 302 inside of which resides a hollow rectangular transducer 304 having piezoelectric crystals for detection of pressure variations. Transducer 304 is supported in housing 302 via a circular rib 306 located at the forward end thereof and rearwardly by directly soldering it to housing 302. Located forwardly of transducer 304 is the switch 310 having electrical leads 312 and 314 extending rearwardly and through rib 306. Leads 312 and 314 are protected from the surrounding fluid environment via a layer of potting compound and are used to connect switch 310 and transducer 304 either in parallel or in series with signal receivers. Variations in circuit designs are described more fully in U.S. Pat. No. 6,318,497 and U.S. patent application Ser. No. 11/503,637 filed on Aug. 14, 2006.

Switch 310 is normally closed but opens when it experiences a predetermined pressure corresponding to specified water depth at which point the signal from transducer 304 is disconnected. Switch 310 resides inside of a tin plated brass front cap 316 that is soldered to the rear housing 302 and is provided with cutouts 318 that permit fluid to acoustically communicate with transducer 304. A forward plastic protective cover 324 is provided and is heat swaged over the front cap 316 to provide tamper resistance as well. A forward facing hole 324 is provided in protective cap 320, as well as cutouts 322, to permit fluid to be in contact with switch 310.

Having described the invention with reference to particular embodiments, other variations will occur to those skilled in the art based on its teachings, and it is intended that all such variants be within the scope of the invention as defined by the claims.

I claim:

1. A pressure-sensitive switch comprising:
   a base member made of electrically-insulating material having first and second surfaces and having an opening formed through a central portion thereof, first and second electrodes mounted on said second surface of said base member;
   a flexible diaphragm formed with plural corrugations having a peripheral portion fixedly secured in a substantially fluid-tight manner to said first surface of said base member and a central portion overlying said opening formed through said base member;
   a post having a first end attached to said central portion of said flexible diaphragm wherein said post travels freely through said opening in said base member, said post having an electrically conductive washer fixedly mounted about it where said post extends beyond said second surface of said base member, said conductive washer electrically contacting said first and second electrodes under the bias of said flexible diaphragm acting under normal atmospheric pressure; and
   a cap fixedly secured in a substantially fluid-tight manner to said second surface of said base member, said cap enclosing an area over said opening through said central portion of said base member, said cap providing sufficient clearance to allow movement of said post and washer beneath said cap;
   the foregoing elements of said switch being arranged so that when said switch is exposed to atmospheric pressure, said washer is in contact with and electrically connects said first and second electrodes, but when said switch is exposed to a pressure substantially in excess of atmospheric pressure, said central portion of said diaphragm forces said washer away from said first and second electrodes, thereby disconnecting said first and second electrodes from each other.

2. The pressure-sensitive switch of claim 1 wherein said diaphragm is substantially circular and said corrugations are substantially rotationally symmetric and concentric with respect to the center of said diaphragm.

3. The pressure-sensitive switch of claim 1 wherein said first end of said post is attached to said flexible diaphragm by solder.

4. The pressure-sensitive switch of claim 1 wherein the area of contact between said post and said diaphragm is sufficiently small so as to not significantly affect the flexing characteristics of said flexible diaphragm.

5. The pressure-sensitive switch of claim 1 wherein said base member comprises a printed circuit board on which said first and second electrodes are formed on said second surface of said base member as a pattern such that said washer electrically connects said first and second electrodes when said pressure-sensitive switch is exposed to atmospheric pressure and separates from said first and second electrodes disconnecting said pressure-sensitive switch when it is exposed to a pressure substantially in excess of atmospheric pressure.

6. The pressure-sensitive switch of claim 5 wherein said pattern on said printed circuit board comprises:
   an outer portion forming part of said first electrode, said outer portion at least partially surrounding said opening of said base member; and
   an inner portion forming part of said second electrode, said inner portion generally closer to said opening of said base member than said outer portion.

7. The pressure-sensitive switch of claim 6 wherein said outer portion forming part of said first electrode is circular in shape and said inner portion forming part of said second electrode forms a circle, wherein contacts extend radially inwardly from said outer portion and radially outwardly from said inner portion, said contacts forming interlaced partial spokes adjacent to each other.

8. A hydrophone cable assembly comprising:
a waterproof hollow elongate prismatic sheath;
at least one tensile member fixedly secured to said sheath;
a plurality of hydrophones disposed within the hollow interior of said sheath at spaced intervals therealong;
signal transmission channels for transmitting signals from said plurality of hydrophones to one end of said sheath; and
at least one pressure-sensitive switch arranged to inactivate said hydrophones when the hydrophone cable assembly is subjected to a pressure greater than a predetermined value, said pressure-sensitive switch comprising at least one switch according to claim 1.

9. A pressure-sensitive switch comprising:
a base member having first and second surfaces and having an opening formed through a portion thereof, first and second electrodes coupled to the second surface of the base member;
a diaphragm configured with plural corrugations coupled in a substantially fluid-tight manner to the first surface of the base member and a portion overlying the opening in the base member;
a moveable member having a first end coupled to the portion of the diaphragm, wherein the moveable member is configured to move through the opening in the base member, the moveable member having an electrically conductive portion, wherein the moveable member extends beyond the second surface of the base member, the electrically conductive portion contacting the first and second electrodes under the bias of the diaphragm acting under normal atmospheric pressure; and
a cap coupled in a substantially fluid-tight manner to the second surface of the base member, the cap enclosing an area over the opening through the base member, the cap providing sufficient clearance to allow movement of the post beneath the cap;
wherein when the switch is exposed to atmospheric pressure, the electrically conductive portion is in contact with and electrically connects the first and second electrodes, and when the switch is exposed to a pressure substantially in excess of atmospheric pressure, the portion of the diaphragm forces the electrically conductive portion of the moveable member away from the first and second electrodes, thereby electrically disconnecting the first and second electrodes from each other.

10. The pressure-sensitive switch of claim 9, wherein the diaphragm is substantially circular and the corrugations are substantially rotationally symmetric and concentric with respect to the center of the diaphragm.

11. The pressure-sensitive switch of claim 9, wherein the first end of the moveable member is attached to the diaphragm by solder.

12. The pressure-sensitive switch of claim 9, wherein an area of contact between the moveable member and the diaphragm is sufficiently small so as to not significantly affect the flexing characteristics of the diaphragm.

13. The pressure-sensitive switch of claim 9, wherein the base member comprises a printed circuit board on which the first and second electrodes are formed on the second surface of the base member as a pattern such that the electrically conductive portion electrically connects the first and second electrodes when the pressure-sensitive switch is exposed to atmospheric pressure and separates from the first and second electrodes thereby electrically disconnecting the pressure-sensitive switch when it is exposed to a pressure substantially in excess of atmospheric pressure.

14. The pressure-sensitive switch of claim 13, wherein the pattern on the printed circuit board comprises:
an outer portion forming part of the first electrode, the outer portion at least partially surrounding the opening of the base member; and
an inner portion forming part of the second electrode, the inner portion generally closer to the opening of the base member than the outer portion.

15. The pressure-sensitive switch of claim 14, wherein the outer portion forming part of the first electrode is circular in shape and the inner portion forming part of the second electrode forms a circle, wherein contacts extend radially inwardly from the outer portion and radially outwardly from the inner portion, the contacts forming interlaced partial spokes adjacent to each other.

16. The pressure-sensitive switch of claim 9, further comprising a hydrophone coupled to the switch.

* * * * *